United States Patent
Pflugrath et al.

(10) Patent No.: US 7,391,324 B1
(45) Date of Patent: Jun. 24, 2008

(54) LOCATOR PLUG SYSTEM

(75) Inventors: Tim A. Pflugrath, Fargo, ND (US); Mike J. Lothspeich, Fargo, ND (US)

(73) Assignee: GPK Products, Inc., Fargo, ND (US)

( * ) Notice: Subject to any disclaimer, the term of this patent is extended or adjusted under 35 U.S.C. 154(b) by 188 days.

(21) Appl. No.: 11/274,837

(22) Filed: Nov. 14, 2005

(51) Int. Cl.
*G08B 13/14* (2006.01)

(52) U.S. Cl. ................................. 340/572.1; 340/572.8

(58) Field of Classification Search ............. 340/572.1, 340/572.8, 572.9
See application file for complete search history.

(56) References Cited

U.S. PATENT DOCUMENTS

| | | | |
|---|---|---|---|
| 4,041,448 A | 8/1977 | Noens | 340/32 |
| 4,106,175 A | 8/1978 | Meyer | 29/243.52 |
| 4,334,227 A | 6/1982 | Marks | 343/719 |
| 4,761,656 A | 8/1988 | Cosman et al. | 343/719 |
| 4,862,088 A | 8/1989 | Etienne et al. | 324/326 |
| 4,873,533 A | 10/1989 | Oike | 343/744 |
| 4,947,012 A | 8/1990 | Minarovic | 219/535 |
| 5,116,654 A | 5/1992 | Cosman et al. | 428/77 |
| 5,430,379 A | 7/1995 | Parkinson et al. | 324/329 |
| 5,583,492 A | 12/1996 | Nakanishi et al. | 340/870.02 |
| 5,771,835 A | 6/1998 | Schneider | 116/209 |
| 5,825,303 A | 10/1998 | Bloss, Jr. et al. | 340/870.02 |
| 5,877,703 A | 3/1999 | Bloss, Jr. et al. | 340/870.02 |
| 6,049,279 A * | 4/2000 | Minarovic | 340/572.8 |
| 6,072,405 A | 6/2000 | Sears | 340/870.02 |
| 6,177,883 B1 | 1/2001 | Jennetti et al. | 340/870.02 |
| 6,181,294 B1 | 1/2001 | Porter et al. | 343/859 |
| 6,271,667 B1 | 8/2001 | Minarovic | 324/326 |
| 6,369,769 B1 | 4/2002 | Nap et al. | 343/719 |
| 6,378,817 B1 | 4/2002 | Bublitz et al. | 248/200 |
| 6,414,605 B1 | 7/2002 | Walden et al. | 340/870.02 |
| 6,437,572 B1 | 8/2002 | Vokey | 324/326 |
| 6,489,891 B1 | 12/2002 | Ho et al. | 340/572.3 |
| 6,538,446 B2 | 3/2003 | Minarovic | 324/326 |
| 6,617,856 B1 | 9/2003 | Royle et al. | 324/329 |
| 6,617,976 B2 | 9/2003 | Walden et al. | 340/870.02 |
| 6,690,278 B2 | 2/2004 | Ziolkowski et al. | 340/572.1 |
| 6,696,951 B2 | 2/2004 | Belka et al. | 340/572.1 |
| 6,941,890 B1 | 9/2005 | Cristo, Jr. et al. | 116/209 |
| 2003/0047226 A1 * | 3/2003 | Hill et al. | 138/104 |

OTHER PUBLICATIONS

3M ScotchMark Electronic Marker System, 3M, Publication Date Unknown, 5 Pages.

\* cited by examiner

*Primary Examiner*—Benjamin C. Lee
*Assistant Examiner*—Shirley Lu
(74) *Attorney, Agent, or Firm*—Michael S. Neustel

(57) ABSTRACT

A locator plug system for efficiently locating utility services that utilize a plug. The locator plug system includes a plug for a utility service and an electronic marker attached to the plug. The electronic marker may be attached to the plug or formed integrally within the plug.

6 Claims, 9 Drawing Sheets

LOCATOR PLUG SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to electronic marker systems and more specifically it relates to a locator plug system for efficiently locating utility services that utilize a plug.

2. Description of the Related Art

Any discussion of the prior art throughout the specification should in no way be considered as an admission that such prior art is widely known or forms part of common general knowledge in the field.

Cleanout fittings for wastewater utility service lines and the like have been in use for years. A two-way cleanout fitting generally has a T-shaped structure with the lower horizontal portion fluidly connected within the wastewater pipe and with an upper tube extending upwardly from the horizontal portion as illustrated in FIG. 1 of the drawings. In addition, a threaded plug is threadably insertable within a threaded upper end of the upper tube. The threaded plug is removed to provide access to the wastewater pipe with a plumbing snake or the like. The cleanout fitting may be comprised of a two-way cleanout fitting which provides for directing the plumbing snake or like in both directions within the wastewater pipe.

Electronic marker systems (passive or active) for marking utility services have been in use for years. A "passive" marker is basically a wire coil and capacitor surrounded in a protective envelope, which is then buried adjacent to the cable, pipe, or other object to be located. The marker is self-contained, with no external, accessible connections. Minnesota Mining & Manufacturing Co. ("3M") markets several kinds of passive markers for different applications as part of its Scotchmark Electronic Marker System ("ScotchMark" is a registered trademark of 3M). See also U.S. Pat. No. 4,761,656 issued to Cosman et al. on Aug. 2, 1988. Passive markers are activated by radiating a signal into the ground in the area where the marker is expected to be found. The signal is emitted via an inductive coil held close to the surface. When the coil is directly over, or near, the passive marker (which is itself an inductive coil), the marker accepts energy within its band pass and stores it, reaching a sustained amplitude during the transmission cycle. When the transmission cycle ends, the marker re-emits the signal with an exponentially decaying amplitude. A second coil within the transceiver unit acts as a receiving antenna which detects the re-radiated signal, alerting the locating technician with an audible tone or other indicator means. However, none of the electronic marker systems available today provide for a plug that incorporates the electronic marker technology.

Hence, to effectively mark a cleanout fitting within a wastewater pipe, the installer not only has to insert a plug into the cleanout fitting, they have to also position an electronic marker within the meter box. Unfortunately, this is not only time consuming but the installer may forget to position an electronic marker within the meter box prior to the meter box being covered with dirt thereby making it difficult to later locate the cleanout fitting.

While these devices may be suitable for the particular purpose to which they address, they are not as suitable for efficiently locating utility services that utilize a plug. Conventional electronic marker systems do not provide for a plug that integrates electronic marker technology into a single and easy to utilize unit.

In these respects, the locator plug system according to the present invention substantially departs from the conventional concepts and designs of the prior art, and in so doing provides an apparatus primarily developed for the purpose of efficiently locating utility services that utilize a plug.

BRIEF SUMMARY OF THE INVENTION

In view of the foregoing disadvantages inherent in the known types of electronic marker systems now present in the prior art, the present invention provides a new locator plug system construction wherein the same can be utilized for efficiently locating utility services that utilize a plug.

The general purpose of the present invention, which will be described subsequently in greater detail, is to provide a new locator plug system that has many of the advantages of the electronic marker systems mentioned heretofore and many novel features that result in a new locator plug system which is not anticipated, rendered obvious, suggested, or even implied by any of the prior art electronic marker systems, either alone or in any combination thereof.

To attain this, the present invention generally comprises a plug for a utility service and an electronic marker attached to the plug. The electronic marker may be attached to the plug or formed integrally within the plug.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a locator plug system that will overcome the shortcomings of the prior art devices.

A second object is to provide a locator plug system for efficiently locating utility services that utilize a plug.

Another object is to provide a locator plug system that integrates electronic marker technology into a plug for a utility line.

An additional object is to provide a locator plug system that may be utilized for various types of utilities.

A further object is to provide a locator plug system that may be utilized to mark a cleanout fitting within a wastewater pipe.

Another object is to provide a locator plug system that eliminates the chance that an installer will forget to position an electronic marker within a meter box.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
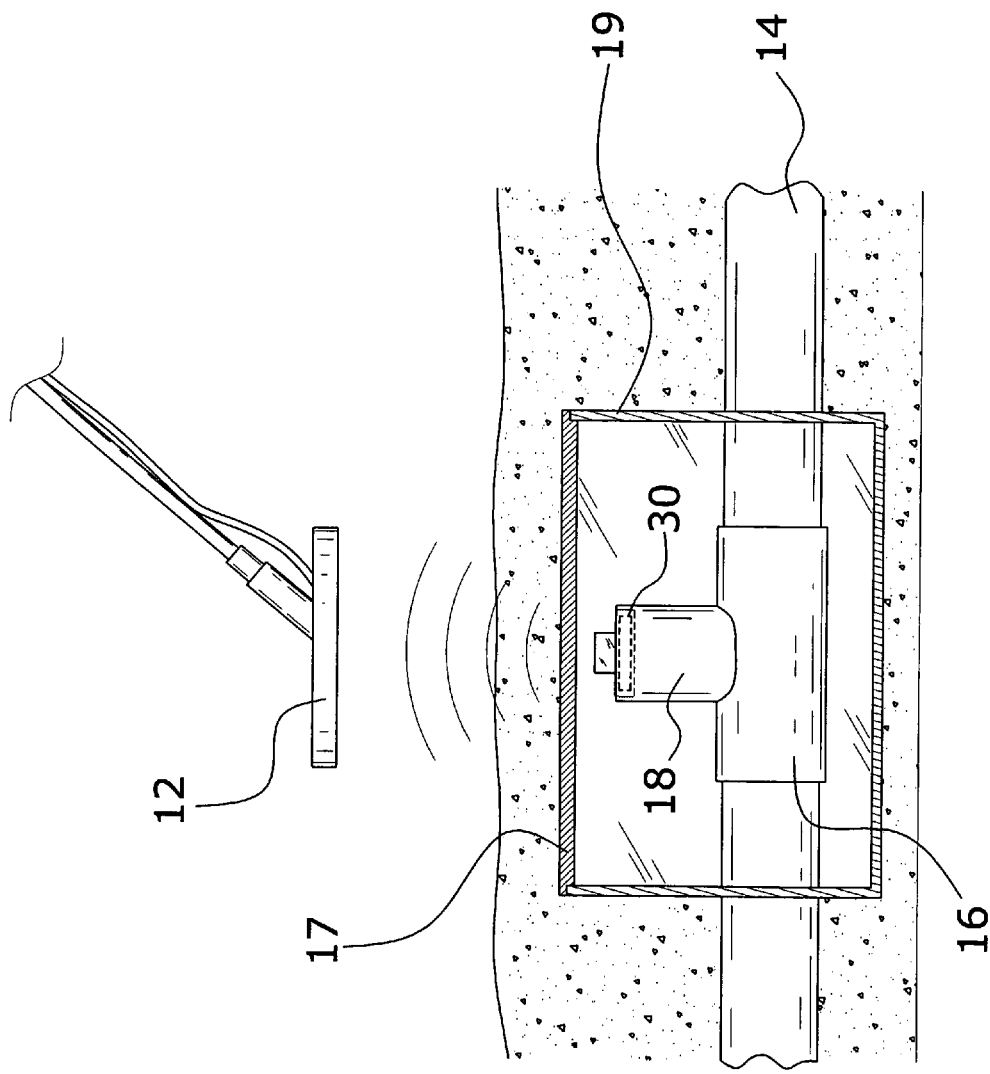
FIG. 1 is a side view of the present invention attached to a cleanout fitting within a wastewater pipe with a locator probe detecting the electronic marker within the plug.

Turning now descriptively to the drawings, in which similar reference characters denote similar elements throughout the several views, FIGS. 1 through 9 illustrate a locator plug system 10, which comprises a plug 20 for a utility service and an electronic marker 30 attached to the plug 20. The electronic marker 30 may be attached to the plug 20 or formed integrally within the plug 20.

B. Plug

The plug 20 is formed and adapted to be attached to a utility service such as but not limited to wastewater, gas and water utilities. A preferred application for the present invention is for cleanout fittings 16 (two-way cleanouts and the like) utilized within wastewater pipes 14 as illustrated in FIG. 1 of the drawings. The plug 20 is attached to the upper end of the upper tube 18 of the cleanout fitting 16 to prevent debris and dirt from entering the wastewater pipe 14 as illustrated in FIG. 1 of the drawings. The cleanout fitting 16 may be positioned within a meter box 19 with a cover 17 or similar structures.

Figure 2:
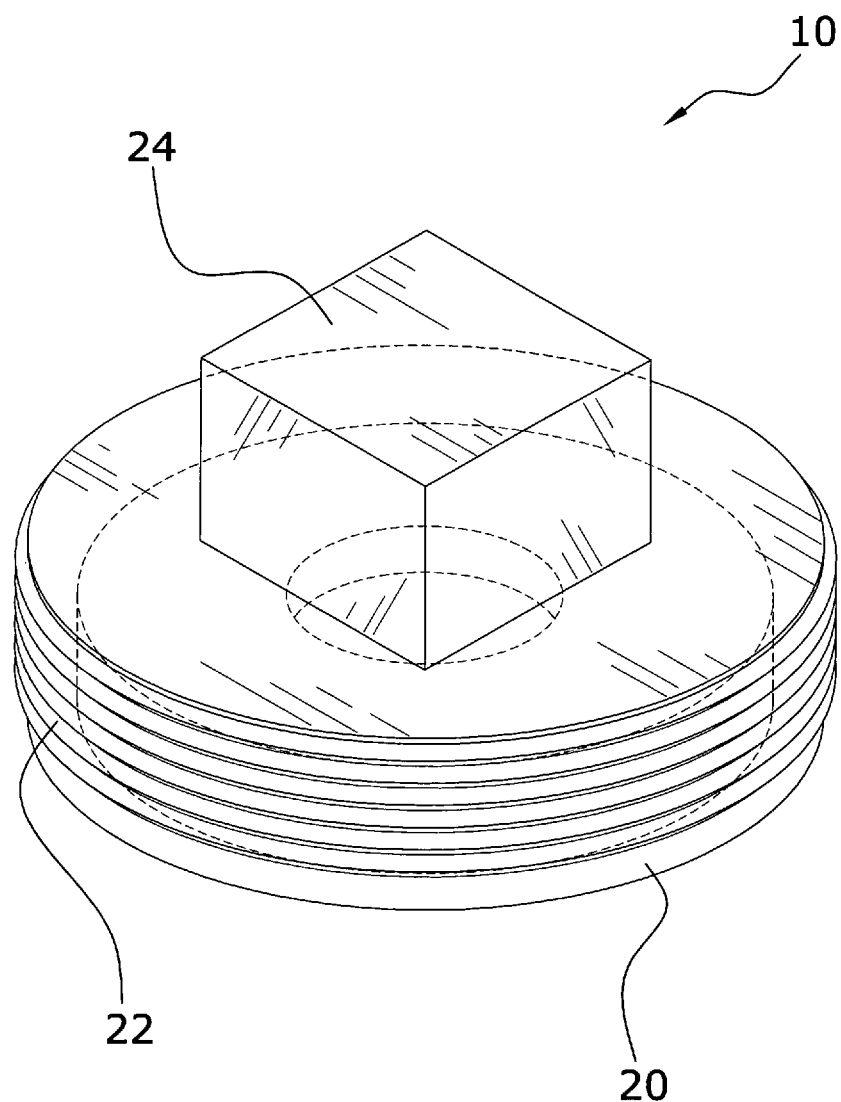
FIG. 2 is an upper perspective view of the present invention.
Figure 5:
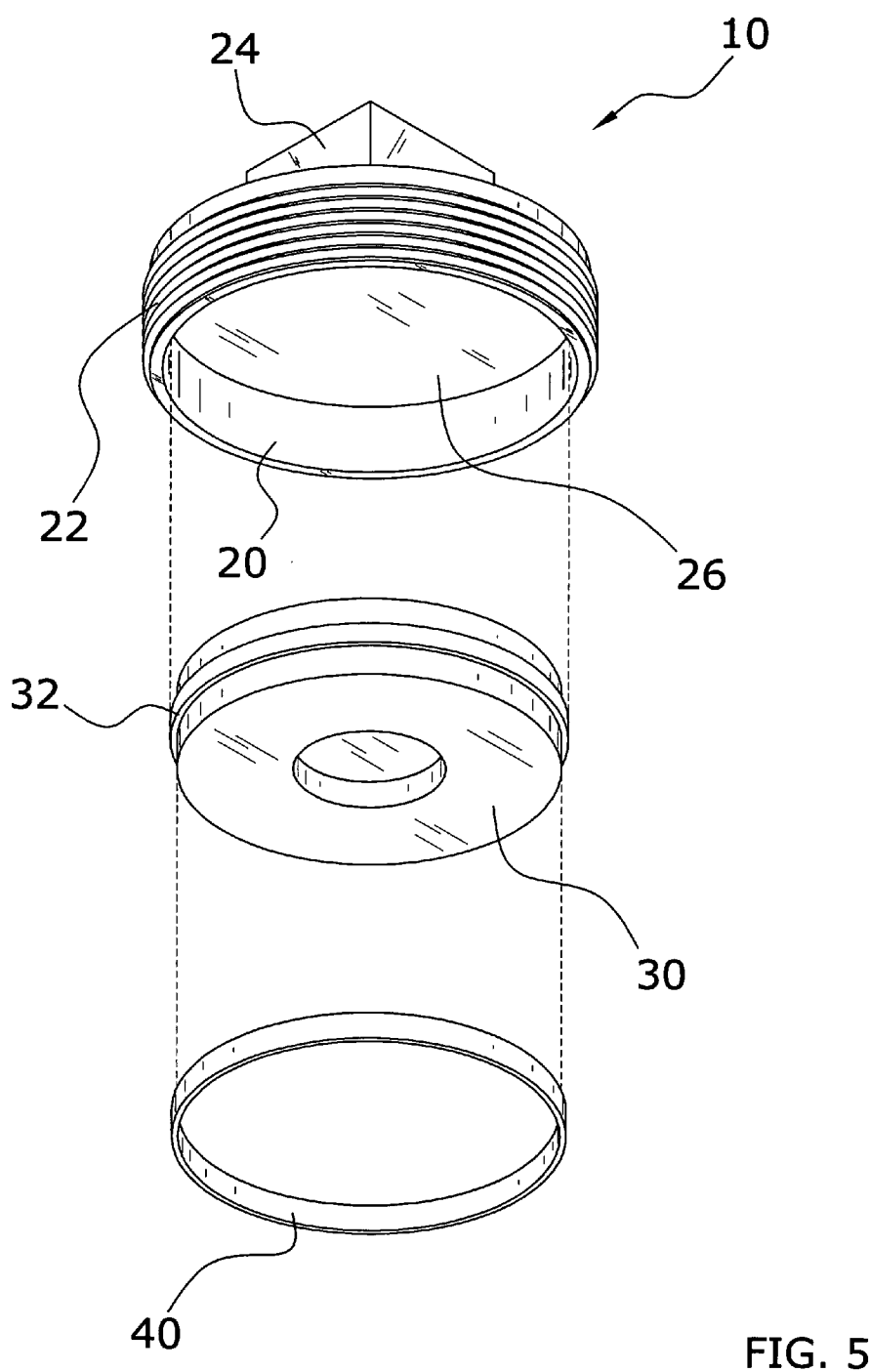
FIG. 5 is an exploded lower perspective view of the present invention.
Figure 6:
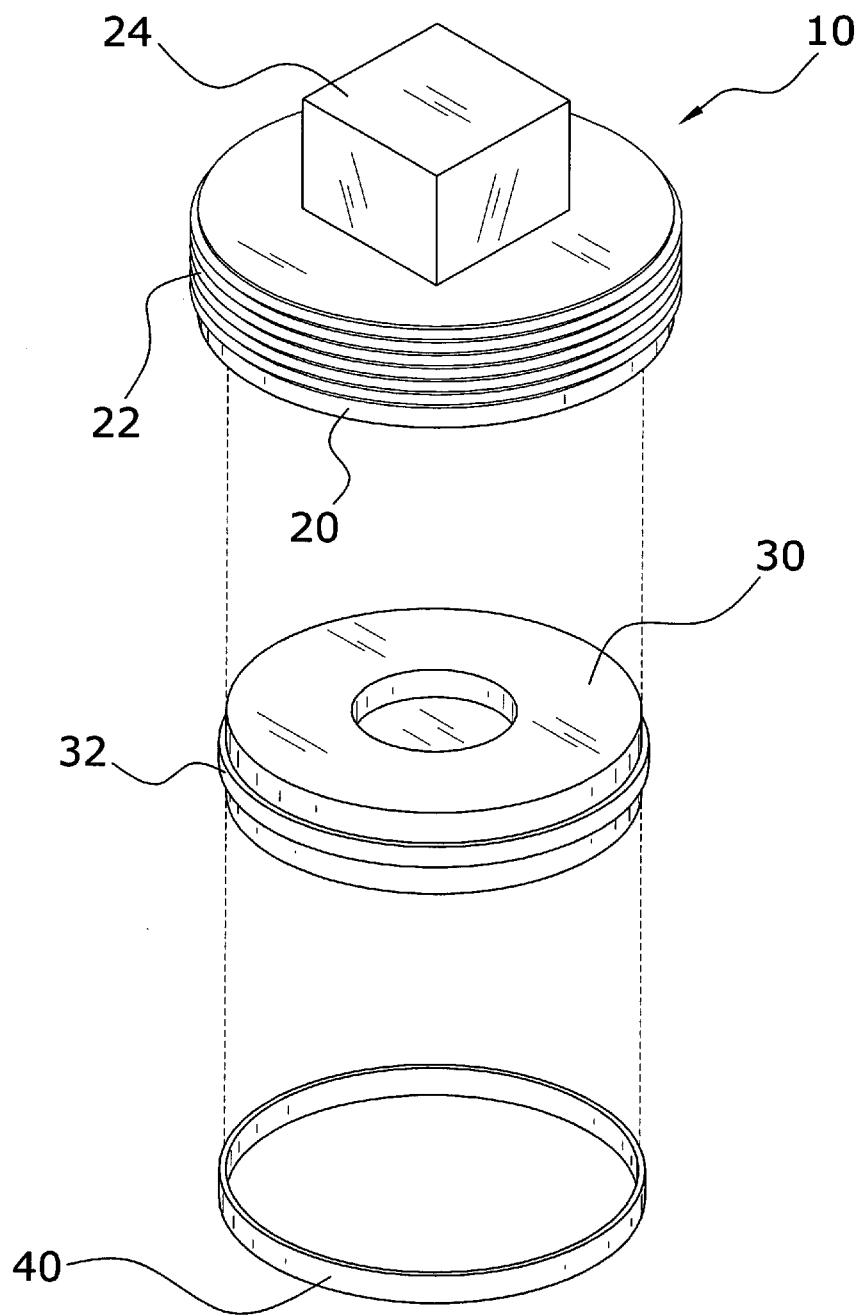
FIG. 6 is an exploded upper perspective view of the present invention.

The plug 20 preferably includes a threaded portion 22 for threadably engaging corresponding threading within the upper tube 18 of the cleanout fitting 16. Conventional plugs 20 include an interior portion within an end thereof usually surrounded by the threaded portion 22 of the plug 20 as best illustrated in FIG. 5 of the drawings. The plug 20 also preferably includes an engaging portion 24 for engaging with a tool such as a wrench. The engaging portion 24 may be a square structure as illustrated in FIGS. 2 and 6 of the drawings.

It can be appreciated that the plug 20 may be comprised of any known or future plug 20 capable of being utilized with respect to underground utility services. In addition, the plug 20 is preferably comprised of a PVC material, however the plug 20 may be comprised of various other types of materials. Also, the plug 20 is preferably circular, however various other shapes may be utilized to construct the plug 20. The threaded portion 22 of the plug 20 may also be comprised of various diameters such as but not limited to a 4 inch, 6 inch or 8 inch male pipe 14 thread. In addition, the threaded portion 22 may be comprised of external or internal threading.

C. Electronic Marker

The electronic marker 30 attached to an interior cavity 26 or positioned integrally within the plug 20. The electronic marker 30 is adapted to be detected by a conventional locator probe 12 which are well known in the art. The electronic marker 30 is preferably passive, however active markers may be utilized.

Figure 3:
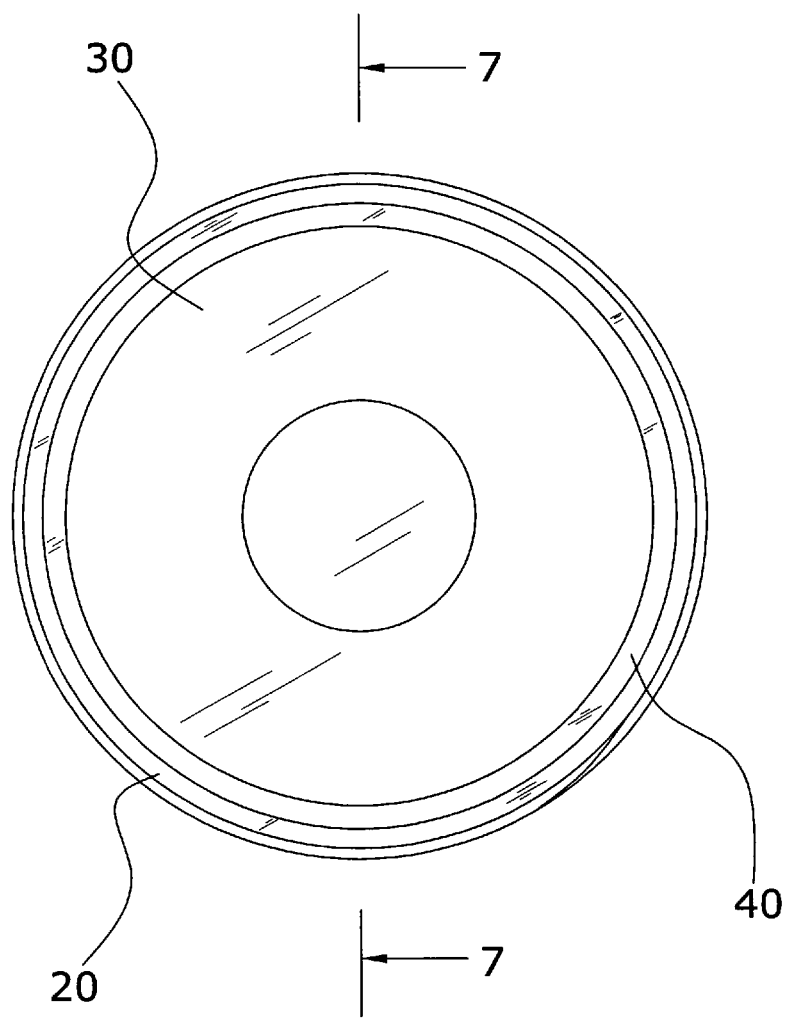
FIG. 3 is a bottom view of the present invention.
Figure 4:
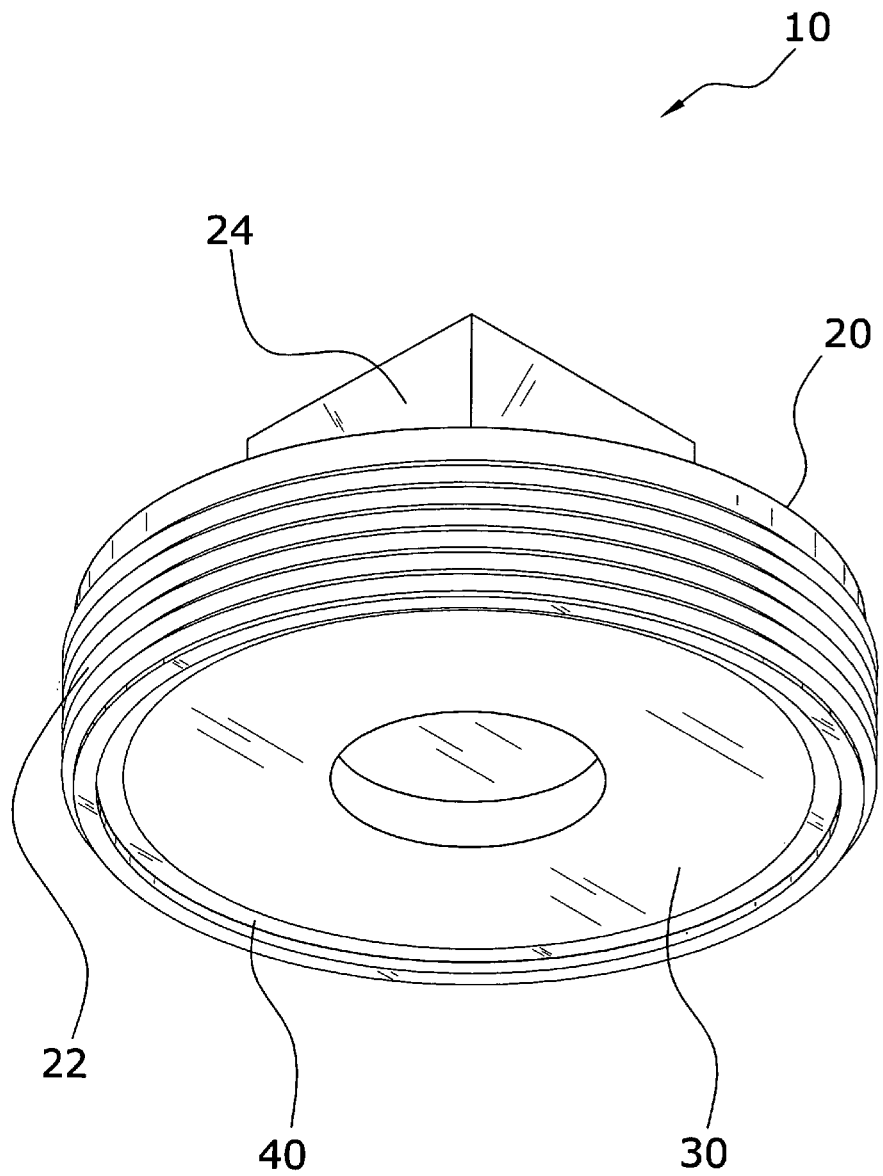
FIG. 4 is a lower perspective view of the present invention.

The electronic marker 30 is preferably comprised of a disc marker having a cincture 32 which is attached within the interior cavity 26 of the plug 20 as best illustrated in FIGS. 3 and 4 of the drawings. An exemplary electronic marker 30 suitable for use within the present invention is manufactured by 3M under the brand name Scotchmark Electronic marker 30 System ("ScotchMark" is a registered trademark of 3M) identified as Part Number 1414-XR which is hereby incorporated by reference into this application. U.S. Pat. No. 4,761,656 issued to Cosman et al. on Aug. 2, 1988 teaches a "passive marker device" that is also suitable for use in the present invention and is hereby incorporated by reference.

D. Securing Means

Figure 8:
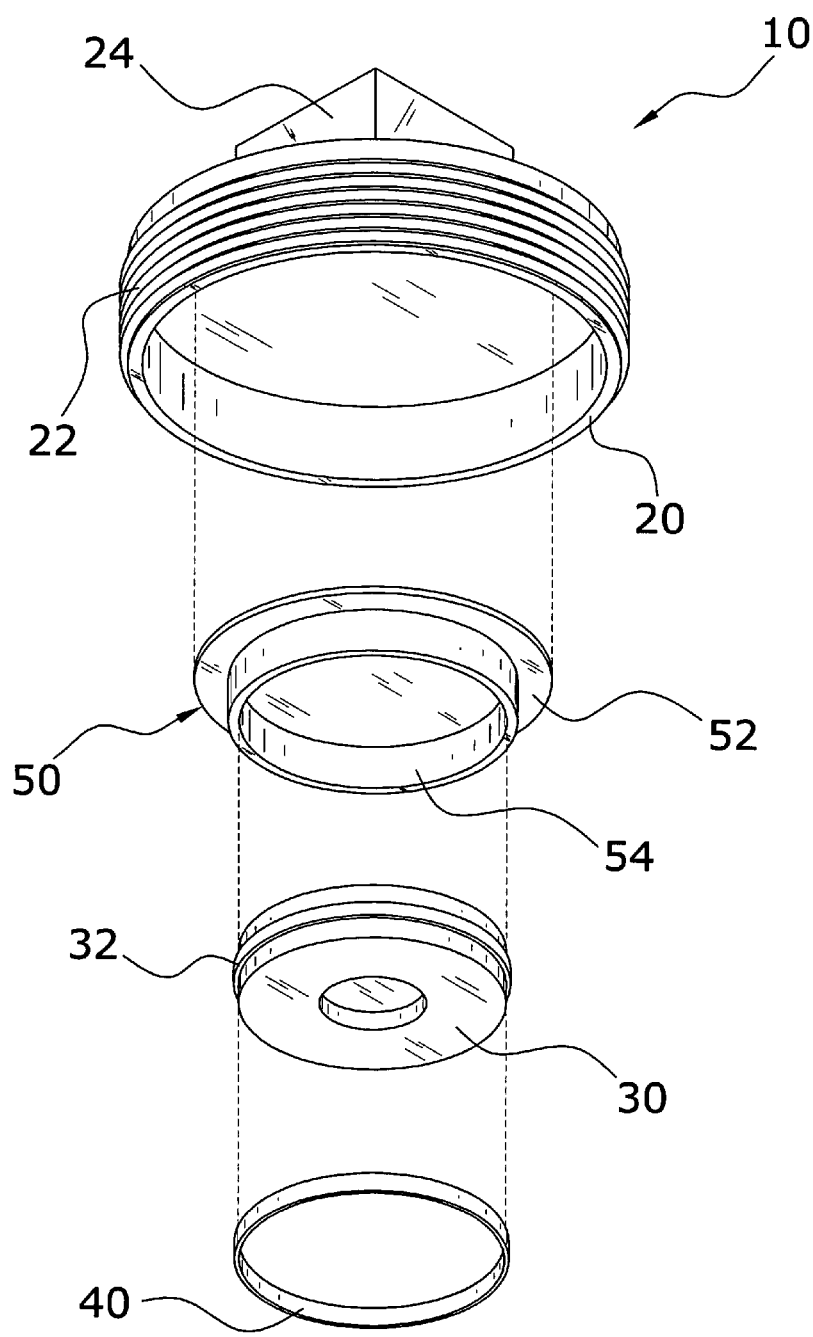
FIG. 8 is an exploded lower perspective view of an alternative embodiment of the present invention.
Figure 9:
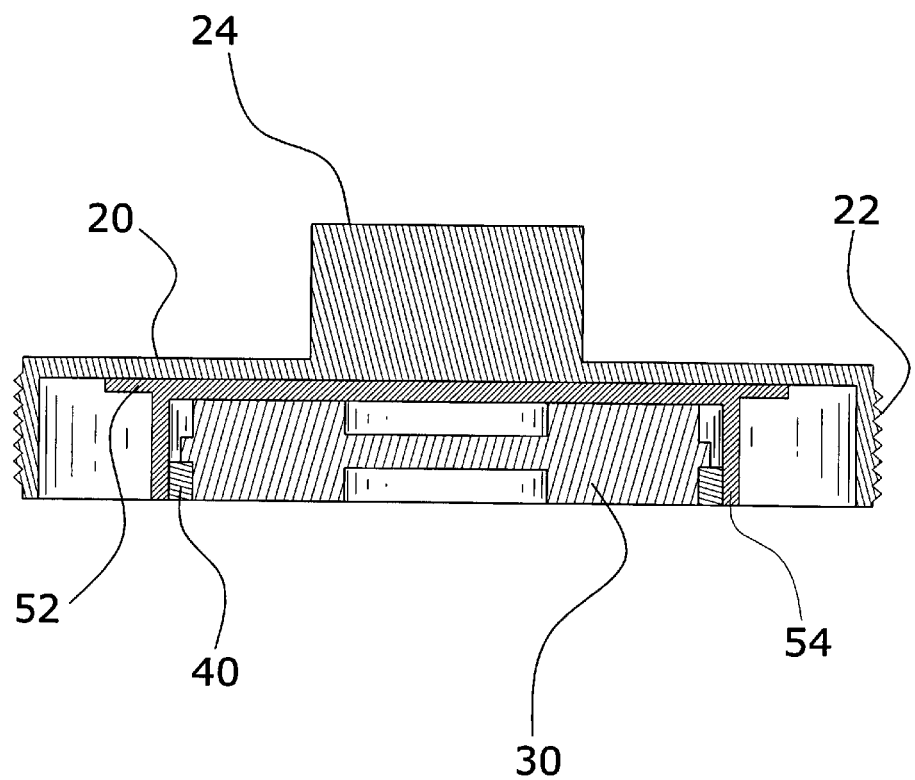
FIG. 9 is a side cutaway view of the alternative embodiment of the present invention.

FIGS. 2 through 7 illustrate securing the electronic marker 30 directly within the interior cavity 26 of the plug 20 suitable for where the electronic marker 30 is approximately the size of the interior cavity 26 of the plug 20. FIGS. 8 and 9 illustrate utilizing an adaptor member 50 for securing the electronic marker 30 within the plug 20 suitable for where the electronic marker 30 is smaller than the interior cavity 26 of the plug 20. Though not shown in the drawings, the electronic marker 30 may be integrally formed within the plug 20 during the formation of the plug 20 (e.g. during molding).

Figure 7:
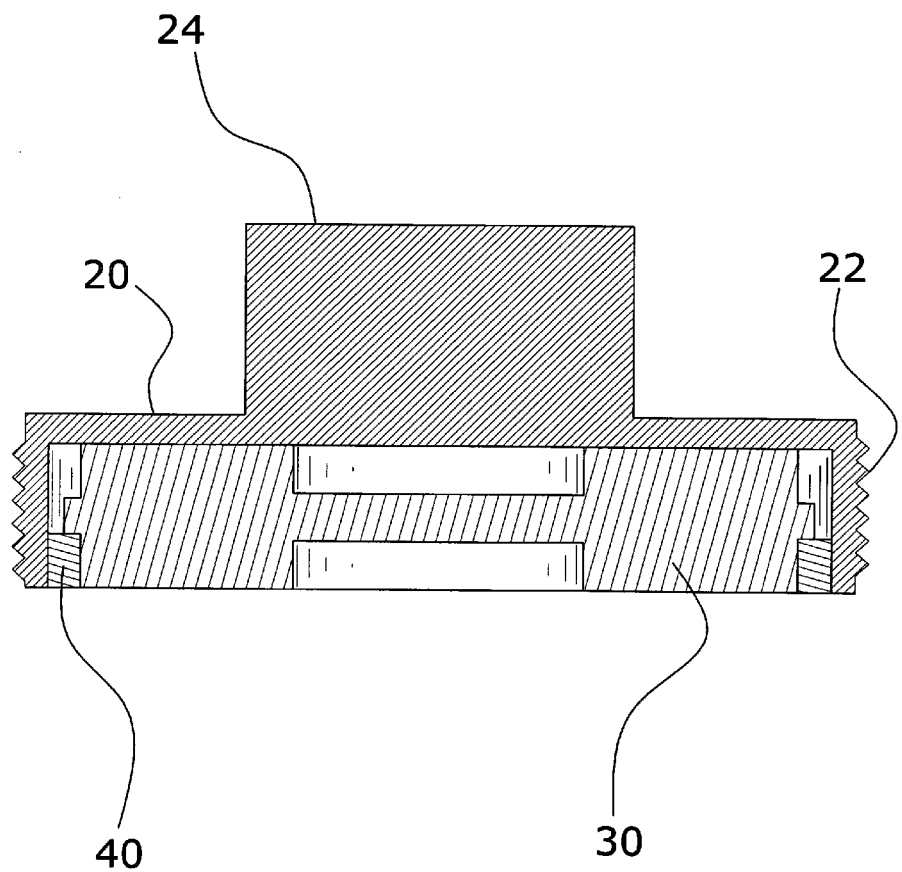
FIG. 7 is a cross sectional view taken along line 7-7 of FIG. 3.

As shown in FIGS. 3 through 7 of the drawings, a securing ring 40 is preferably formed for fitting within the interior cavity 26 adjacent a sidewall of the interior cavity 26 and for engaging a cincture 32 of the disc marker. The securing ring 40 is secured within the interior cavity 26 of the plug 20 with an adhesive, fasteners or other means for securing the disc marker within the plug 20 as best illustrated in FIG. 7 of the drawings. The securing ring 40 may be comprised of a full partial circle. It can be appreciated that the electronic marker 30 may also be directly attached within the interior cavity 26 of the plug 20 with a suitable adhesive, fastener or other means.

Alternative, an adaptor member 50 may be utilized for a plug 20 having a larger diameter (e.g. 6 inch or 8 inch). As shown in FIGS. 8 and 9 of the drawings, the adaptor member 50 is preferably comprised of an end member 52 and a ring member 54 extending from the end member 52. The ring member 54 is formed for receiving the disc marker as best illustrated in FIG. 9 of the drawings. The adaptor member 50 is adapted to be attachable within the interior cavity 26 of the plug 20 with an adhesive, fastener or other securing means. The securing ring 40 is formed for securing within the ring member 54 adjacent a sidewall of the ring member 54 and for engaging a cincture 32 of the disc marker as shown in FIG. 9 of the drawings. The securing ring 40 is secured within the ring member 54 for securing the disc marker within the ring member 54 with an adhesive, fasteners or other securing means. The end member 52 preferably extends outwardly from the ring member 54 as best illustrated in FIG. 8 of the drawings.

E. Operation of Invention

A plug 20 containing the electronic marker 30 is first provided. The installer then positions the plug 20 within an upper end of the upper tube 18 of the cleanout fitting 16 of a wastewater pipe 14. The installer then rotates the plug 20 so that the plug 20 becomes threadably secured within the upper tube 18 as shown in FIG. 1 of the drawings. After the plug 20 is fully secured within the upper tube 18, the user then closes the cover 17 of the meter box 19 or similar structure. When it is desired to locate the cleanout fitting 16, a conventional locator probe 12 is utilized for locating the electronic marker 30 positioned within the plug 20. Once the plug 20 and electronic marker 30 are located, the individual is able to remove the soil to expose and remove the cover 17 of the meter box 19 thereby providing access to the cleanout fitting 16 (or other device marked with the plug 20).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A locator plug system for a utility service, comprising:
   a plug adapted to be attached to a utility service, wherein said plug includes an interior cavity having a sidewall;
   a disc marker attached to said interior cavity of said plug;
   wherein said disc marker is comprised of a circular disc shape having an outer perimeter;
   a cincture extending radially from said outer perimeter dividing said outer perimeter into a lower portion and an upper portion; and
   a securing ring having a central opening and an outer surface;
   wherein said central opening receives said lower portion of said disc marker;
   wherein said outer surface of said securing ring is secured to said sidewall of said interior cavity;
   wherein an upper edge of said securing ring engages a lower edge of said cincture of said disc marker to retain said disc marker within said plug.

2. The locator plug system of claim 1, wherein said disc marker is adapted to be detected by a locator probe.

3. The locator plug system of claim 1, wherein said disc marker is passive.

4. The locator plug system of claim 1, wherein said disc marker is integrally formed within said plug.

5. The locator plug system of claim 1, wherein said plug includes a threaded portion.

6. The locator plug system of claim 1, wherein said plug includes an engaging portion for engaging with a tool.

* * * * *